(12) United States Patent
Hui et al.

(10) Patent No.: US 9,712,433 B2
(45) Date of Patent: Jul. 18, 2017

(54) MAINTAINING AND COMMUNICATING NODAL NEIGHBORING INFORMATION

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 268 days.

(21) Appl. No.: 13/653,037

(22) Filed: Oct. 16, 2012

(65) Prior Publication Data

US 2014/0108643 A1   Apr. 17, 2014

(51) Int. Cl.
| | | |
|---|---|---|
| G06F 15/16 | (2006.01) | |
| H04L 12/753 | (2013.01) | |
| H04L 12/721 | (2013.01) | |

(52) U.S. Cl.
CPC ............ *H04L 45/48* (2013.01); *H04L 45/123* (2013.01)

(58) Field of Classification Search
CPC . H04L 63/1416; H04L 63/1441; H04L 29/00; H04L 43/00; H04L 41/00; H04L 45/48
USPC .......................................... 709/224, 238, 242
See application file for complete search history.

(56) References Cited

U.S. PATENT DOCUMENTS

| | | | |
|---|---|---|---|
| 7,369,557 B1 * | 5/2008 | Sinha ...................... | H04L 45/38 370/392 |
| 7,756,040 B1 | 7/2010 | Andriantsiferana et al. | |
| 8,077,675 B2 | 12/2011 | Stephenson et al. | |
| 8,385,228 B2 | 2/2013 | Shaffer et al. | |
| 2008/0126565 A1 * | 5/2008 | Osano et al. ................. | 709/242 |
| 2008/0212494 A1 * | 9/2008 | Thubert et al. ............... | 370/254 |
| 2008/0304824 A1 | 12/2008 | Barbieri et al. | |
| 2009/0028160 A1 * | 1/2009 | Eswaran et al. ......... | 370/395.32 |
| 2009/0216910 A1 * | 8/2009 | Duchesneau ......... | G06F 9/5072 709/250 |
| 2010/0285790 A1 * | 11/2010 | Baliosian .............. | H04W 16/24 455/422.1 |
| 2011/0164527 A1 * | 7/2011 | Mishra et al. ................ | 370/252 |
| 2011/0261710 A1 * | 10/2011 | Chen ................... | H04L 43/0876 370/252 |

(Continued)

FOREIGN PATENT DOCUMENTS

CN    102253820    *  6/2011

OTHER PUBLICATIONS http://colinsurprenant.com/blog/2012/05/12/continuous-bloom-filter/ dated May 12, 2012.*

(Continued)

*Primary Examiner* — Melvin H Pollack
*Assistant Examiner* — Messeret f Gebre
(74) *Attorney, Agent, or Firm* — Parker Ibrahim & Berg LLC; James M. Behmke; Stephen D. LeBarron (57) ABSTRACT

In one embodiment, a nodal device receives information from each of its neighboring nodes in a network. The information identifies a link quality between the nodal device and each of its neighboring nodes. The link quality information is stored in one or more bloom filters in the nodal device such that a table having a compressed format is provided in the bloom filter. The table includes probabilistic identifiers to identify link quality between the nodal device and each of its neighboring nodes.

14 Claims, 5 Drawing Sheets

(56) References Cited

U.S. PATENT DOCUMENTS

2013/0010615 A1     1/2013   Hui et al.
2013/0051250 A1     2/2013   Shaffer et al.

OTHER PUBLICATIONS

A Sybil attack detection approach using neighboring vehicles in VANET, pp. 151-158, 2011.*
Pingfeng Zhong, "An IPv6 address lookup algorithm based on recursive balanced multi-way range trees with efficient search and update," 2011 International Conference on Computer Science and Service System (CSSS), Nanjing, 2011, pp. 2059-2063.*
Hierarchical routing for large networks—performance evaluation and optimization Kleinrock, L.; Kamoun, F.. Computer Networks 1.3 (Jan. 1977): pp. 155-174.*
R. C. Shah and J. M. Rabaey, "Energy aware routing for low energy ad hoc sensor networks," 2002 IEEE Wireless Communications and Networking Conference Record. WCNC 2002 (Cat. No. 02TH8609), 2002, pp. 350-355 vol. 1.*
Winter, T., et al.; *RPL: IPv6 Routing Protocol for Low-Power and Lossy Networks, Internet Engineering Task Force (IETF)*, Mar. 2012.
Vasseur, et al., *Routing Metrics used for Path Calculation in Low Power and Lossy Networks draft-ietf-roll-routing-metrics-12*, Networking Working Group, Nov. 8, 2010.
Thubert, P., *Objective Function Zero for the Routing Protocol for Low-Power and Lossy Networks (RPL)*, Internet Engineering Task Force (IETF), Mar. 2012.
Surprenant, Colin, *Continuous Bloom Filter*, colinsurprenant.com/blog, May 12, 2012.

\* cited by examiner

MAINTAINING AND COMMUNICATING NODAL NEIGHBORING INFORMATION

TECHNICAL FIELD

The present disclosure relates generally to computer networks, and, more particularly, to maintaining and communicating network nodal information.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG) in addition to a set of features to bound control traffic, support local (and slow) repair, etc. The RPL routing protocol provides a flexible method by which each node performs DODAG discovery, construction, and maintenance.

One problem that confronts LLNs is communication challenges. For instance, LLNs communicate over a physical medium that is strongly affected by environmental conditions that change over time. Some examples include temporal changes in interference (e.g. other wireless networks or electrical appliances), physical obstruction (e.g. doors opening/closing or seasonal changes in foliage density of trees), and propagation characteristics of the physical media (e.g. temperature or humidity changes). The time scales of such temporal changes can range between milliseconds (e.g. transmissions from other transceivers) to months (e.g. seasonal changes of outdoor environment). Additionally, low-cost and low-power designs limit the capabilities of LLN transceivers. In particular, LLN transceivers typically provide low throughput. Furthermore, LLN transceivers typically support limited link margin, making the effects of interference and environmental changes visible to link and network protocols.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments, a nodal device receives information from each of its neighboring nodes in a network. The information identifies a link quality between the nodal device and each of its neighboring nodes. The link quality information is stored using one or more a Bloom filters in the nodal device such that a table having a compressed format is provided in the Bloom filter. The table includes probabilistic identifiers to identify link quality between the nodal device and each of its neighboring nodes.

In another embodiment, information from a Bloom filter provided in a nodal device is received in a Network Management System (NMS) for a network having nodal devices coupled via communication links. The received information identifies link qualities between the nodal device and each its neighboring nodes in the network. The received information from the Bloom filter is interpolated in the NMS to determine a status of the communication links coupling the nodal devices in the network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, WPC and others. In addition, a Mobile Ad-Hoc Network (MANET) is a type of wireless ad-hoc network, which is generally considered a self-configuring network of mobile routes (and associated hosts) connected by wireless links, the union of which forms an arbitrary topology.

Smart object networks, such as sensor networks in particular, are a specific type of network consisting of spatially distributed autonomous devices such as sensors that cooperatively monitor physical or environmental conditions at different locations, such as, e.g., temperature, pressure, vibration, sound, radiation, motion, pollutants, etc. Other types of smart objects include actuators, e.g., objects responsible for turning on/off an engine or performing other actions. Sensor networks are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

Figure 1:
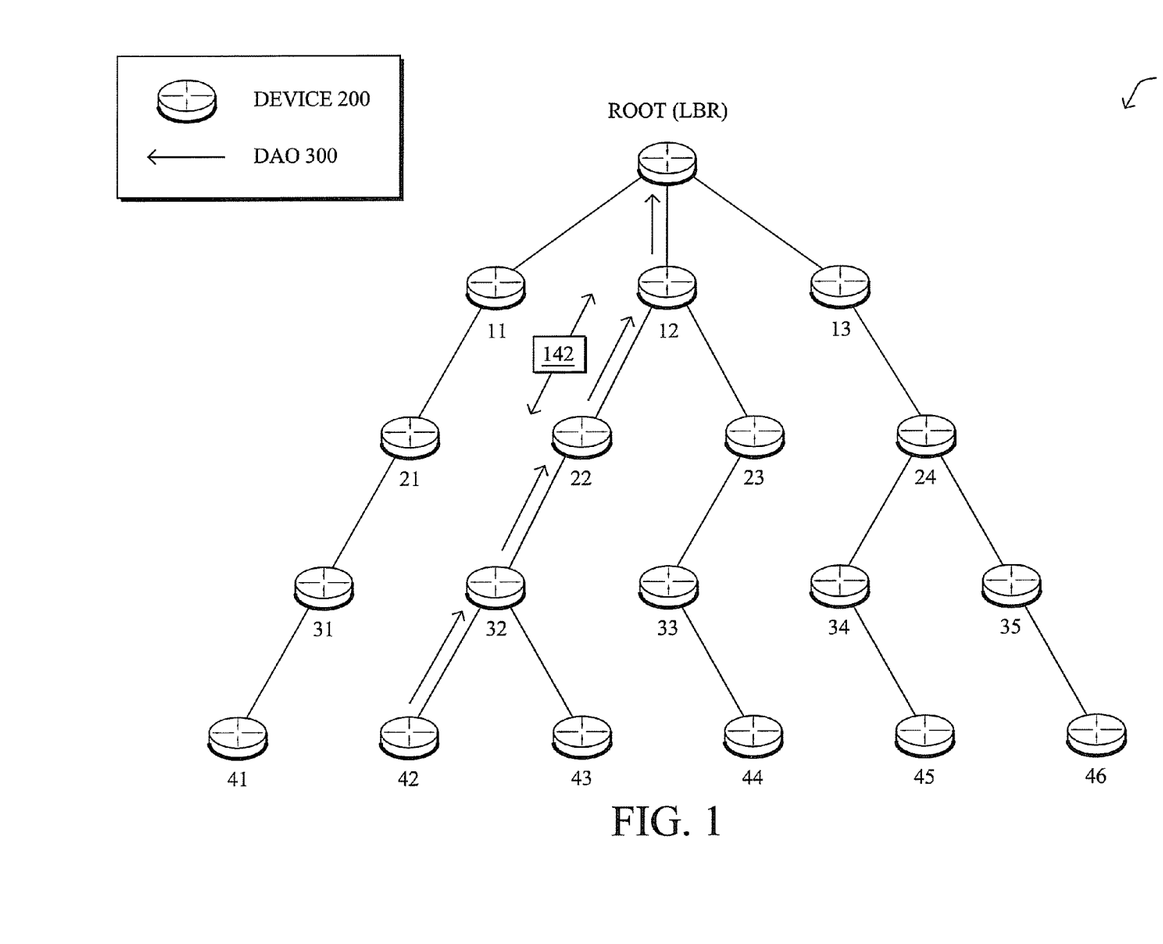
FIG. 1 illustrates an example computer network and a directed acyclic graph (DAG)

FIG. 1 is a schematic block diagram of an example computer network 100 illustratively comprising nodes/devices 200, such as, e.g., routers, sensors, computers, etc., interconnected by various methods of communication (e.g., and labeled as shown, "LBR," "11," "12," . . . "46"). For instance, the links of the computer network may be wired links or may comprise a wireless communication medium, where certain nodes 200 of the network may be in communication with other nodes 200, e.g., based on distance, signal strength, current operational status, location, etc. Those skilled in the art will understand that any number of nodes, devices, links, etc. may be used in the computer network, and that the view shown herein is for simplicity. Illustratively, certain devices in the network may be more capable than others, such as those devices having larger memories, sustainable non-battery power supplies, etc., versus those devices having minimal memory, battery power, etc. For instance certain devices 200 may have no or limited memory capability. Also, one or more of the devices 200 may be considered "root nodes/devices" (or root capable devices) while one or more of the devices may also be considered "destination nodes/devices."

Data packet messages 140 (e.g., traffic and/or messages sent between the devices/nodes) may be exchanged among the nodes/devices of the computer network 100 using predefined network communication protocols such as the Transmission Control Protocol/Internet Protocol (TCP/IP), User Datagram Protocol (UDP), Multi-Protocol Label Switching (MPLS), various proprietary protocols, etc. In this context, a protocol consists of a set of rules defining how the nodes interact with each other. In addition, packets within the network 100 may be transmitted in a different manner depending upon device capabilities, such as source routed packets.

Figure 2:
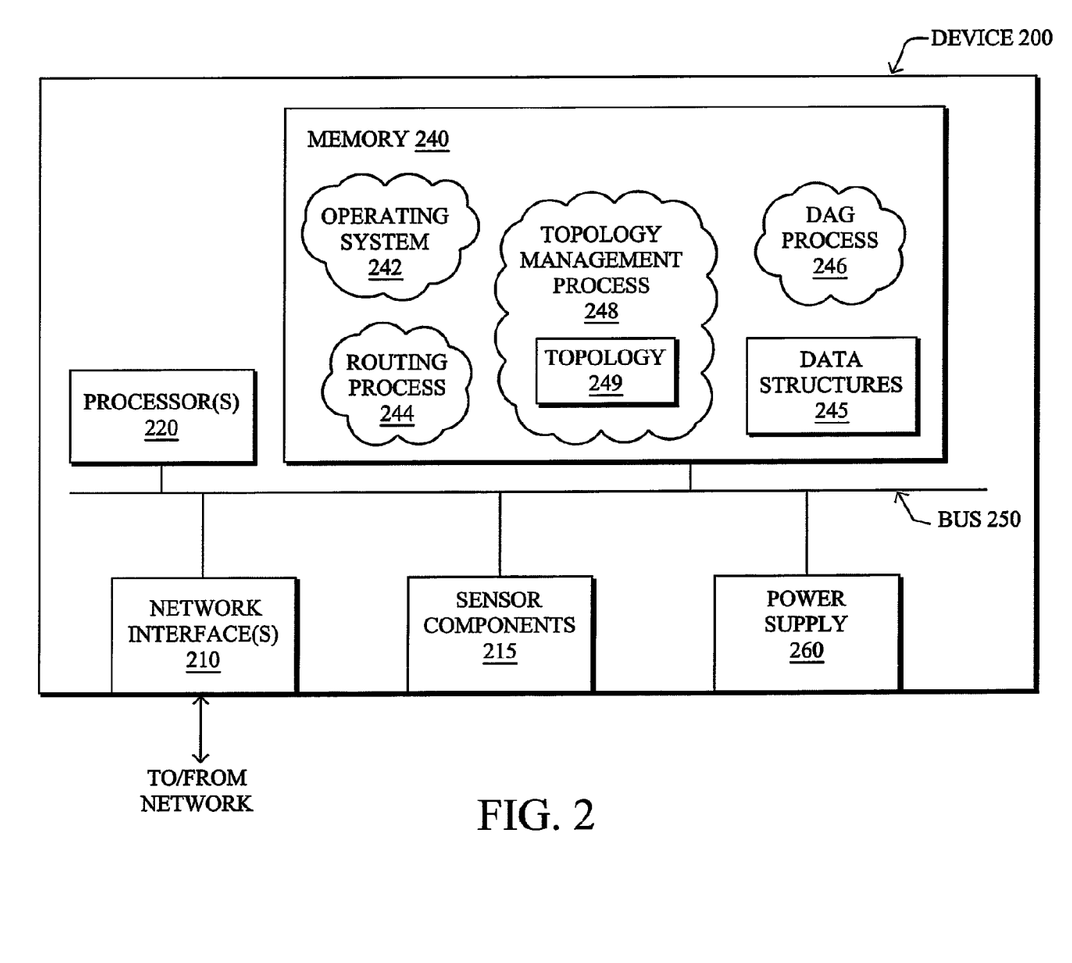
FIG. 2 illustrates an example network device/node.

FIG. 2 is a schematic block diagram of an example node/device 200 that may be used with one or more embodiments described herein, e.g., as a root node or sensor. The device may comprise one or more network interfaces 210, one or more sensor components 215 (e.g., sensors, actuators, etc.), a power supply 260 (e.g., battery, plug-in, etc.), one or more processors 220 (e.g., 8-64 bit microcontrollers), and a memory 240 interconnected by a system bus 250. The network interface(s) 210 contain the mechanical, electrical, and signaling circuitry for communicating data over physical and/or wireless links coupled to the network 100. The network interface(s) may be configured to transmit and/or receive data using a variety of different communication protocols, including, inter is alia, TCP/IP, UDP, wireless protocols (e.g., IEEE Std. 802.15.4, WiFi, Bluetooth (Registered trademark),), Ethernet, powerline communication (PLC) protocols, etc.

The memory 240 comprises a plurality of storage locations that are addressable by the processor(s) 220 and the network interface(s) 210 for storing software programs and data structures associated with the embodiments described herein. As noted above, certaro devices may have limited memory or no memory (e.g., no memory for storage other than for programs/processes operating on the device). The processor(s) 220 may comprise necessary elements or logic adapted to execute the software programs and manipulate the data structures, such as routes or prefixes of a routing/forwarding table 245 (notably on capable devices only). An operating system 242, portions of which are typically resident in memory 240 and executed by the processor(s), functionally organizes the device by, inter alia, invoking operations in support of software processes and/or services executing on the device. These software processes and/or services may comprise routing process/services 244, which may include an illustrative directed acyclic graph (DAG) process 246. Also, for root devices (or other management devices), a topology management process 248 and associated stored topologies 249 may be present in memory 240, for use as described herein. It will be apparent to those skilled in the art that other processor and memory types, including various computer-readable media, may be used to store and execute program instructions pertaining to the techniques described herein. Also, while the description illustrates various processes, it is expressly contemplated that the various processes may be embodied as modules configured to operate in accordance with the techniques herein (e.g., according to the functionality of a similar process).

Routing process (services) 244 contains computer executable instructions executed by the processor(s) 220 to perform functions provided by one or more routing protocols, such as proactive or reactive routing protocols as will be understood by those skilled in the art. These functions may, on capable devices, be configured to manage routing/forwarding table 245 containing, e.g., data used to make routing/forwarding decisions. In particular, in proactive routing, connectivity is discovered and known prior to computing routes to any destination in the network, e.g., link state routing such as Open is Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can direct the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) A number of use cases require specifying a set of link and node metrics, some of them being dynamic, thus requiring specific smoothing functions to avoid routing instability, considerably draining bandwidth and energy;

4) Constraint-routing may be required by some applications, e.g., to establish routing paths that avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnects are constrained; LLN routers typically operate with constraints, e.g., processing power, memory, and/or energy (battery), and their interconnects are characterized by, illustratively, high loss rates, low data rates, and/or instability. The LLN may be sized with devices ranging from a few dozen to as many as thousands or even millions of LLN routers, and may support point-to-point traffic (between devices inside the LLN), pointto-multipoint traffic (from a central control point to a subset of devices inside the LLN) and multipoint-to-point traffic (from devices inside the LLN towards a central control point).

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc.

A DAG is a directed graph that represents a computer network, such as computer network 100, and that has the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or, as used herein, one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG. Also, the routing protocol allows for including an optional set of constraints to compute a constrained path, such as where if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, estimated transmission count (ETX), etc., while is example constraints that may be placed on the route selection may comprise various reliability thresholds, restrictions on battery operation, multipath diversity, load balancing requirements, bandwidth requirements, transmission types (e.g., wired, wireless, etc.), and also a number of selected parents (e.g., single parent trees or multi-parent DAGs). Notably, an example for how routing metrics may be obtained may be found in an IETF Internet Draft, entitled "Routing Metrics used for Path Calculation in Low Power and Lossy Networks"<draft-ietf-roll-routing-metrics-12> by Vasseur, et al. (Nov. 10, 2010 version). Further, an example OF (e.g., a default OF) may be found in an IETF RFC, entitled "RPL Objective Function 0"<RFC 6552> by Thubert (March 2012 version).

Building of a DAG may utilize a discovery mechanism to build a logical representation of the network, and route dissemination to establish state within the network so that routers know how to forward packets toward their ultimate destinations. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths is are routes that lead in the direction from DAG roots towards leaf nodes, e.g., generally going against the orientation of the edges within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward (UP) direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root which can, in turn, build the topology and locally compute downward routes to all nodes in the DODAG. Such nodes are then reachable using source routing techniques over regions of the DAG that are incapable of storing downward routing state.

Figure 3:
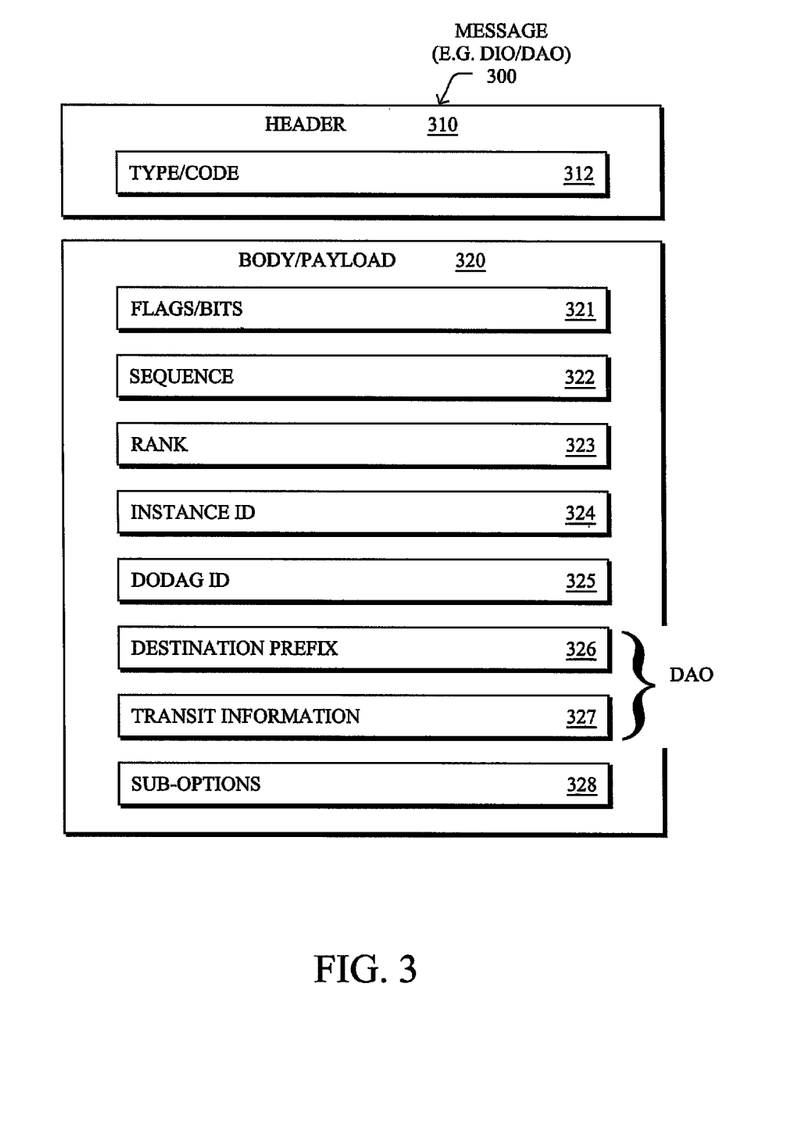
FIG. 3 illustrates an example message.

FIG. 3 illustrates an example DAO message 300 with a simplified control message format that may be used for discovery and route dissemination when building a DAG, e.g., as a DIO or DAO. Message 300 illustratively comprises a header 310 having one or more fields 312 that identify the type of message (e.g., a RPL control message) and a specific code indicating the specific type of message, e.g., a DIO or a DAO (or a DAG Information Solicitation). A body/payload 320 of the message may comprise a plurality of fields used to relay pertinent information. In particular, the fields may comprise various flags/bits 321, a sequence number 322, a rank value 323, an instance ID 324, a (DO)DAG ID 325, and other fields, each as may be appreciated in more detail by those skilled in the art. Further, for DAO messages, fields for a destination prefix 326 and a reverse route stack 327 may also be included. For either DIOs or DAOs, one or more additional sub-option fields 328 may be used to supply additional or custom information is (such as, e.g., the VGF) within the message 300. For instance, an objective code point (OCP) sub-option field may be used within a DIO to carry codes specifying a particular objective function (OF) to be used for building the associated DAG.

With a generalized computer network 100 being described above, it is to now be appreciated maintaining nodal neighbor information is a fundamental mechanism in any network, but especially so in LLNs. Unlike traditional wired networks, the nodes/devices (200) themselves discover and determine the quality of links to neighboring nodes. Discovering and maintaining the status regarding neighboring nodes is such a fundamental primitive in ad-hoc networks that the Internet Engineering Task Force (IETF) has specified the Neighborhood Discovery Protocol (NHDP) for use with ad-hoc networks.

However, one challenge is that it is not currently practicable for a network device to maintain state information about its neighboring devices. Typically, LLNs operate with strict resource constraints (memory, computation, and communication). Furthermore, urban-scale LLNs (i.e. Smart Grid AMI networks) can reach densities of hundreds or thousands of nodes. Thus, even maintaining a list of 64-bit Extend Unique Identifiers (EUI-64 identifiers) for neighboring nodes is typically not feasible, in addition to maintaining information about link quality (e.g. RSSI, LQI, and ETX), frequencyhopping synchronization (e.g. time and schedule synchronization), or security information (e.g. frame counters and keys).

Thus, it is to be appreciated that maintaining and communicating a list (table) of 1-hop nodal neighbors is a significant primitive relative to LLNs. For instance, this is relevant to detecting asymmetric links, where network link quality in one direction is good but poor in another direction, which is a well-known problem in LLNs. One method to determine if a link is asymmetric was to ping the neighboring node, which enables the device to determine link quality measurements in both directions across the link. However, if a node is not capable of maintaining a list of all neighboring nodes, it cannot determine the devices it has already evaluated and must periodically ping a large number of neighbors. Another method to determine if a link is asymmetric was to is periodically broadcast a list of neighboring nodes. However, doing so not only requires nodes to maintain a list of 1-hop neighbors but also to advertise that list to neighboring nodes. In both scenarios (ping and advertise), the aggregate cost of detecting asymmetric links grows with the square of network density, which is particularly disadvantageous.

Further, when monitoring and deploying a network, one important piece of information that a network operator can use to determine the health of a network is the node neighbor tables. However, it is currently not practicable for a node to report (periodically or on-demand) its complete list of neighboring nodes to a Network Management System (NMS). Of significance, it is not practicable for a node to retain a complete list of all its neighboring nodes in memory.

It is noted, a number of local routing mechanisms have been proposed for LLNs, but they typically require 1-hop or 2-hop neighborhood information. For instance, local routing repair mechanisms need to determine 2-hop neighborhood information so that they can route around failures, which again is not practicable.

Thus, it is to be appreciated that in order to more efficiently determine where paths/links must be changed in the network, central path computation requires a particular knowledge of the neighboring devices for each node in the network (and not merely knowledge of a subset of these, namely the selected best next hops).

Accordingly, in conjunction with certain illustrated embodiments, described below is an effective mechanism for maintaining and communicating 1-hop neighborhood information in LLNs using Bloom filters.

Figure 4:
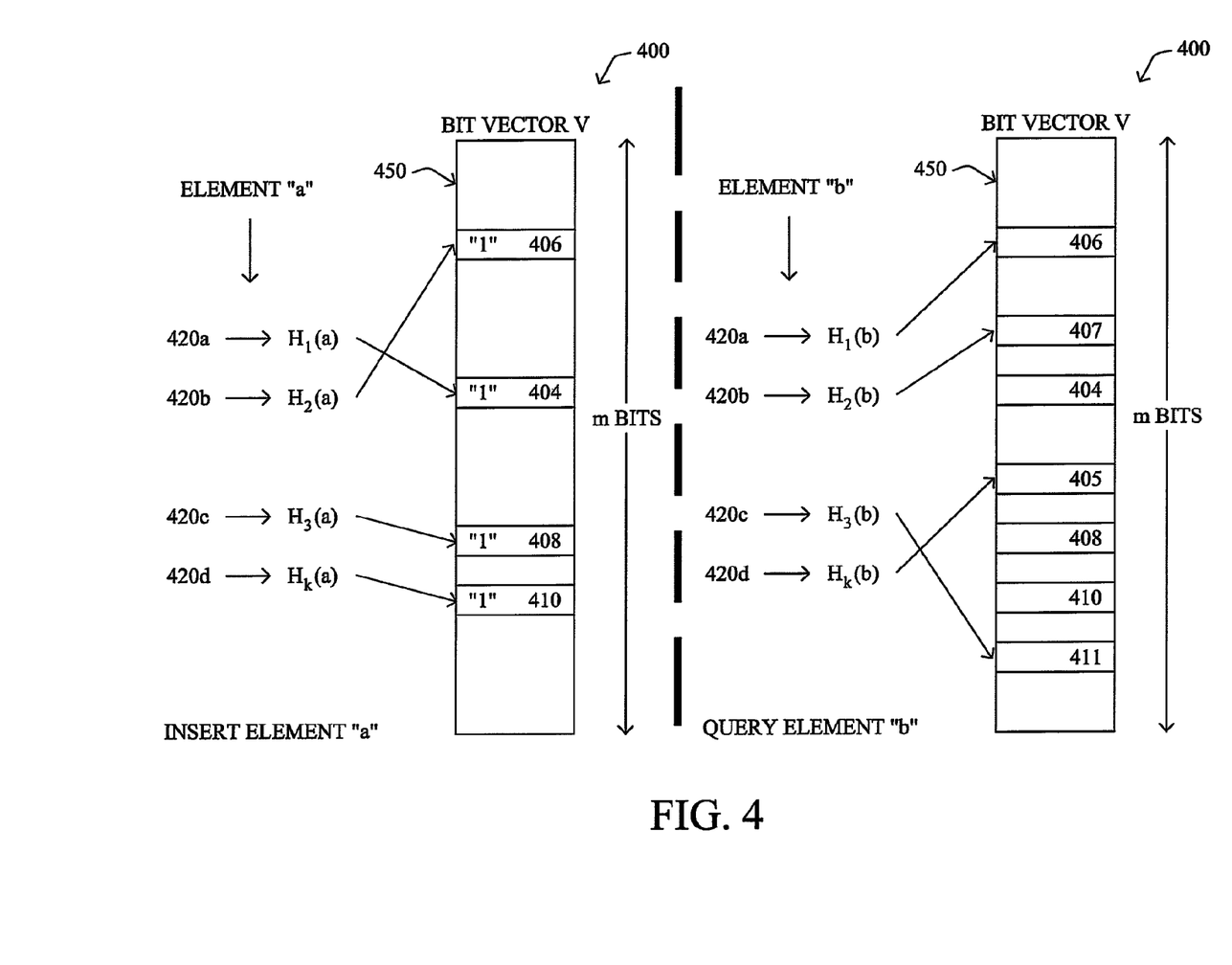
FIG. 4 illustrates an example Bloom filter.

With reference now to FIG. 4, illustrated is an example of such a Bloom filter 400. As understood by one skilled in the art, Bloom filter 400 allocates a vector v of m bits, initially all set to 0, and then choose k independent hash functions, h1, h2, . . . , hk, each with range $\{1, \ldots, m\}$. Bloom filter 400 has four hash functions 420a-420d is shown implemented with a multi-ported memory 450, where the memory 450 has k ports. In this manner, the k array positions 404, 406, 408, 410 of the memory 450 may be written or queried in parallel.

The left-hand side of FIG. 4 illustrates insertion of an element (a) into a set (A). To insert an element a member A, the bits (404, 406, 408, 410, respectively) at positions h1(a), h2(a), . . . , hk(a) in v are set to "1". (A particular bit might be set to "1" multiple times). It should be understood that "1" or "true" as used herein is not intended to be limited to any particular value. For at least one embodiment, the value "1" is implemented as a one-bit logic-high value. However, this example embodiment should not be taken to be limiting. Instead, for alternative embodiments the "1" value may be a logic-low value or may be a multi-bit value.

The right-hand side of FIG. 4 illustrates a query to determine if an element (b) is a member of the set (A). FIG. 4 illustrates that, to query for an element (to test if it is in set A), the element is fed into each of the k hash functions, resulting in k bit positions. Given a query for b, the bits (406, 407, 411, 405, respectively) at positions h1(b), h2(b), . . . , hk(b) are checked. Again, because the Bloom filter 400 illustrated in FIG. 4 is implemented with a k-ported memory 450, the k array positions (positions h1(b), h2(b), . . . , hk(b)) may be checked in parallel.

If any of the bits is "0", then b is not in the set A. (If the element were in the set, then presumably all such bits would have been set to "1" when the element was added to the set). Otherwise, if all bits are "1", then either the element is in the set, or the bits have been set to "1" during the insertion of other elements. Thus, if all bits are set to "1", it may be assumed that b is in the set although there is a certain probability that this is not true (because the bits may have been set during the insertion of other elements). The (relatively rare) case in which the bits are set for the insertion of other elements, is called a "false positive" or "false drop", when the query erroneously indicates membership in the set for element b.

In summary, a Bloom filter is a space-efficient probabilistic data structure that is used to test whether an element is a member of a set. Typically, an empty Bloom filter is a bit-vector of m bits, all set to 0 wherein there is k different hash functions defined, each of which maps an element to one of the m array positions with a uniform random distribution. To add an element to the Bloom filter, feed it to each of the k hash functions to get k array positions and set them to 1. To test whether an element is in the set, feed it to each of the k hash functions to get k array positions. If any are 0, then the element is not in the set. If all are 1, then either the element is in the set or may indicate a false positive. Again, false positives are possible, but false negatives are not. The bit-vector size depends on the number of inserted elements and desired false positive rate. For instance, a typically Bloom filters uses 1.44*log_2(1/r) bits of space per element, where r is the false positive rate of the Bloom filter. For example, to support r<1%, the Bloom filter requires 10 bits (1.25 bytes) per element. To support r<0.1%, the Bloom filter requires 15 bits (1.875 bytes) per element.

Illustratively, the techniques described herein may be performed by hardware, software, and/or firmware, such as in accordance with the topology management process 248, which may contain computer executable instructions executed by the processor 220 (or independent processor of interfaces 210) to perform functions relating to the techniques described herein, e.g., in conjunction with routing process 244 (and/or DAG process 246). For example, the techniques herein may be treated as extensions to conventional protocols, such as the one or more routing protocols (e.g., RPL) or other communication protocols, and as such, may be processed by similar components understood in the art that execute those protocols, accordingly.

It is to be appreciated that even though Bloom filters were developed with focus on the database community, Bloom filters have also been applied to networking in the areas of distributed caching, P2P networking, routing, and management. It is further to be appreciated that existing record route mechanisms all rely on a list of node identifiers that name the set of nodes and their relative order. In this regard, and preferably under the control of process 244 (FIG. 2), and in accordance with an illustrated embodiment, operationally, a Bloom filter is utilized and operative to compact data packet record route entries and allow recording arbitrary length record routes with a given fixed header size. Therefore, with only 1-2 bytes per entry (vs. 16 bytes per entry), Bloom filters is significantly reduce the record route overhead. By operating on a fixed-size data structure, routers along the path of a computer network, such as an LLN, can continue to record information about the path even if the source did not correctly estimate the path length. It is to be understood encoding a signal includes maintaining a Bloom filter within the data packet itself which preferably encodes the identifier of each device along the signal path and their nodal hop counts.

As described below, the illustrated embodiments herein provide a mechanism to significantly reduce the cost of maintaining 1-hop neighbor nodal information necessary to support functions such as asymmetric link determination, network management topology reporting, local re-routing and central path computation (or assisted routing using a PCE-like approach), which cannot be efficiently performed with existing technologies.

In regards to maintaining 1-hop nodal information using Bloom filters, it is to be understood nodal devices (200) within a mesh network typically transmit some kind of broadcast message at a minimal rate. In accordance with an illustrated embodiment, and with returning reference to FIG. 1, nodal devices (200) in a network (100) are to be understood to include a Bloom filter, preferably in the memory (240) of each device (FIG. 2). When a nodal device (e.g., 23) receives link frame information from a neighbor (e.g., 33), the nodal device (23) adds the neighbor's identifier (33) (e.g. EUI-64) to an initialized Bloom filter. Preferably after passage of a predetermined time period, the Bloom filter includes the set of neighbors for nodes that were heard since the Bloom filter was initialized. It is to be understood that a Bloom filter preferably encodes a compressed neighbor table and does not provide the node (23) with a convenient list of deterministic identifiers for its neighboring nodal devices. Thus, this compressed format enables the neighbor node table to be communicated in a significantly more efficient manner to neighboring nodes or other devices (i.e. NMS). It is noted that while the compressed format does not deterministically list each entry in the set, it enables a number of probabilistic mechanisms/applications as is further described below.

Figure 5:
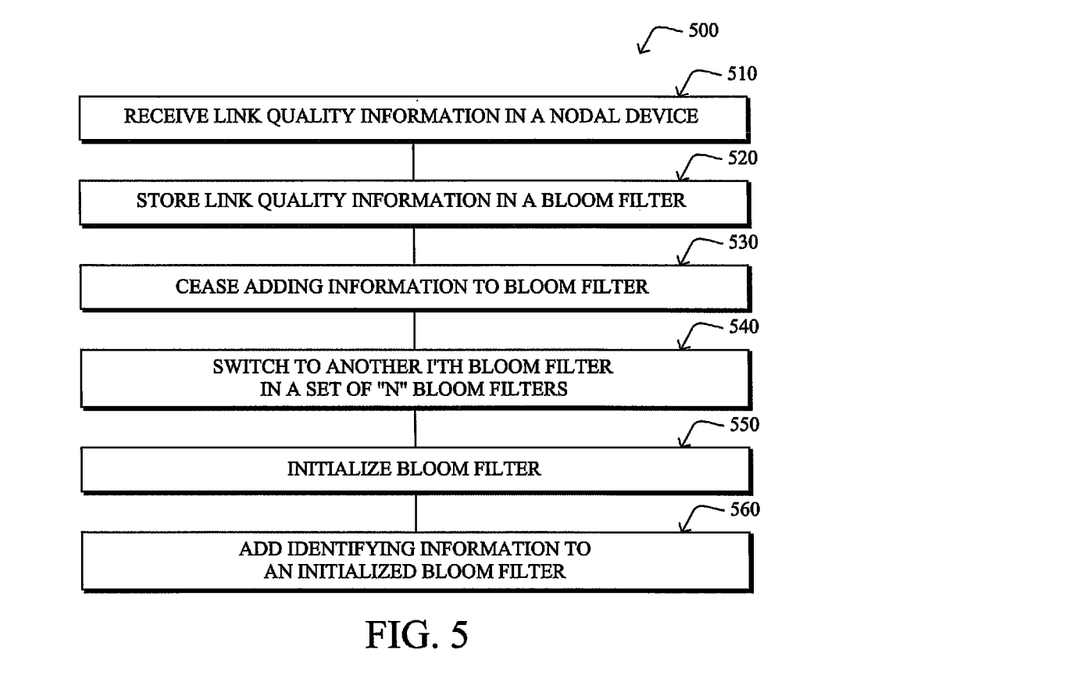
FIGS. 5 and 6 illustrate example simplified procedures for maintaining and communicating network nodal information.

For instance, and with reference to process 500 of FIG. 5 (and with continuing is reference to FIG. 1), information containing link quality information (e.g., link frame information) is received in a nodal device (e.g., 23) from preferably each of its neighboring nodal devices (e.g., 12 and 33) in network 100 (step 510). As mentioned above, this received information preferably identifies the quality of link(s) between the nodal device (23) and each of its neighboring nodes (12 and 33). This link quality information (e.g., a boolean indicator) is stored using one or more Bloom filters provided in the nodal device (23) such that a compressed neighbor table is formatted in the Bloom filter containing probabilistic identifiers to identify link quality between the nodal device (23) and each of its neighboring nodes (12 and 33) during the period of time it was capturing such information (step 520).

It is to be understood that another particular challenge with utilizing Bloom filters is deleting a neighbor node entry from the aforesaid nodal list (table) when a particular node is no longer coupled (e.g., it is no longer a neighbor node) to a device or it's link quality has significantly degraded. It is noted that relative to a nodal device (e.g., 23), neighbors come (e.g., 33) and go (e.g., 24) and maintaining both neighbor nodes additions and deletions are thus important. While counting Bloom filters are typically used to support deletions, they also require knowledge of the element that needs to be deleted. To obtain this information, and in accordance with an illustrated embodiment, a set of N Bloom filters are encoded in a nodal device (where N>=2) wherein each of the N Bloom filters are rotated, such that only one of the N Bloom filters captures neighbor node information (as mentioned above) preferably during a prescribed time period. For instance, after passage of a predetermined time (e.g., every X seconds) while a node (23) was identifying elements to the i'th Bloom filter in the set of N Bloom filters (step 520), the node (23) will cease adding elements to that i'th Bloom filter in the set of N Bloom filters (step 530). The node then switches to a next i'th Bloom filter (which may be in a sequential order) (step 540), initializes that i'th Bloom filter (step 550), and thereafter preferably begins to add elements to the newly initialized Bloom filter (step 560). To have a unified view of all neighboring nodes detected across the last N−1 Bloom filters, the node (23) preferably performs a bit-wise OR operation of all the Bloom filters (step 570). Thus, by rotating the use of Bloom filters in predetermined time periods (e.g., is every X seconds), any neighboring node that has not been heard for the past N*X seconds will eventually be phased out of all Bloom filters.

It is to be understood that another particular challenge with utilizing Bloom filters is that their false-positive rate depends on the size of the bit-vector size of the Bloom filter and the number of entries added to the Bloom filter. In overcoming this challenge, a nodal device (e.g., 23) in the certain illustrated embodiments preferably adaptively adjusts the bit-vector size for their Bloom filters based on the number of neighboring nodes it has added to each Bloom filter. However, it is noted that the node (23) preferably does not combine Bloom filters of a different size using a bit-wise OR operation. Alternatively, the node (23) preferably performs multiple queries for each Bloom filter of different bit-vector size. As a result, the node (23) preferably does not frequently change the size of the bit-vector filed for a Bloom filter.

This embodiment is particularly advantageous in that in order to achieve a 1% false positive rate for a Bloom filter, a Bloom filter requires approximately 10 bits per element. This is less than 16% the size of maintaining EUI-64 addresses. Thus, when 2 rotating Bloom filters are utilized, less than 32% space is used compared to maintaining EUI-64 addresses. It is noted that in many applications a higher false-positive rate may be tolerated (e.g., when using the neighbor table for informational purposes or simply to optimize out some additional probing). For instance, with a 10% false positive rate, the Bloom filter space requirements can be further reduced by approximately 50%. It is also noted however that false positive are not problematic in many applications. For instance, if a NMS or central routing engine receives a BF listing a neighbor nodal device "X", a second check can be made to determine if nodal device "X" is also reported somewhere in the network (100), which aids in filtering out false positives for the Bloom filter.

In accordance with another illustrated embodiment, 1-hop nodal neighbor information is utilized to filter asymmetric links. It is noted it is known to advertise a list of 1-hop neighbors that have been recently heard having good signal quality. In accordance with the present illustrated embodiment, alternative to including such a list, a Bloom filter is provided in nodal devices (23) configured and operative to encode 1-hop neighbor information. Using this encoded information, a node (23) can efficiently is determine if a recent transmission to the neighboring node (e.g., 33) had good signal quality by querying for its own identifier in the Bloom filter received in the advertisement message. It is noted that because false positives may cause a node (23) to falsely believe that a link has good bi-directional quality, the node (23) may preferably probe the link to verify that it is good link.

It is to be appreciated that including Bloom filters in nodal devices (200) provides a significant improvement when compared to not retaining 1-hop neighborhood information. This is because without determining information regarding whether a neighboring node can receive information over a good signal quality link, the node had no choice but to probe the link. However, in accordance with the illustrated embodiment, when utilizing Bloom filters providing good 1-hop neighbor information, a node (200) can now mitigate the need to probe a link to determine a quality of signal. For instance, and even with a false-positive rate of 10%, the use of Bloom filters typically reduces the need to perform such a probe by approximately 90%, which is significant. Thus, by using a Bloom filter, the node provides good information regarding 1-hop neighbors with a small false-positive probability.

Figure 6:
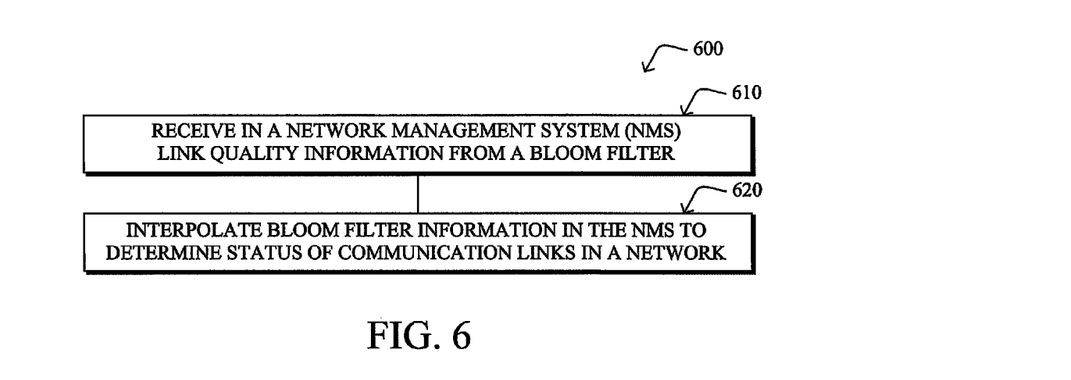

With reference to process 600 of FIG. 6, and in accordance with another illustrated embodiment, Bloom filters are utilized to report neighbor nodal information to a central device (e.g., NMS or PCE). In one such embodiment, nodes (200) can periodically report the Bloom filter to a Network Management System (NMS) and/or a central computation engine. Using the Bloom filter information and the list of devices in the network (100), the NMS can then determine what nodes (200) are likely (with some minimal false positive rate) to be reachable to each individual node (e.g., 22). That is, information from a Bloom filter provided in one of the nodal devices is received in a Network Management System (NMS) for a network having nodal devices coupled via communication links. (step 610). The received information identifies link qualities between the nodal device and each neighboring node in the network, This received information is preferably interpolated in the NMS to determine a status of the communication links coupling the nodal devices in the network (step 620).

In another embodiment, the NMS can query an individual node (e.g., 32) to is determine if another node (e.g., 42) is a neighboring device. When a node (42) receives such a query, it preferably applies the query to its own Bloom filter and returns the result.

Additionally, when reporting link-state information for use with such centralized routing, Bloom filters may also be utilized to report the link metric. In particular, rather than reporting a single Bloom filter, a device (e.g., 32) preferably maintains a number of Bloom filters necessary for a range of metric values (e.g. ETX between 1 and 1.5, 1.5 and 2, etc.). Thus, by maintaining a Bloom filter for each range of metric values, the device (32) is enabled to communicate the set of neighboring nodal devices that provide "good" links vs. "average" links vs. "poor" links. Hence, the centralized routing engine may also compute routes based on the reported link qualities.

In accordance with yet another illustrated embodiment, Bloom filters are utilized in the nodes (220) of a network (100) to assist in local re-routing of signals. It is to be understood such local re-routing is achieved whereby a node (200) preferably obtains 2-hop neighboring node information. For instance, in one illustrative embodiment, a node (200) preferably transmits a link-local multicast query for nodes that have entry N+2 as a 1-hop neighbor node. In another illustrative embodiment, the node (200) preferably caches the Bloom filters to determine subsets of its neighboring nodes to provide 2-hop neighboring node information. It is noted that this aforesaid embodiment is also dependent upon memory resources available to the LLN devices (200).

With certain illustrated embodiments being described above, it is to be appreciated that by utilizing Bloom-filters network devices for 1-hop neighboring nodes is useful with many mechanisms that requires a device "X" to determine if a device "A" is a neighbor of device "B". Thus, what has been described in conjunction with certain illustrated embodiments is the utilization of Bloom filters for encoding 1-hop neighboring node information for filtering asymmetric links, reporting link topologies to an NMS, to assist in centralized routing decisions, and assist in local rerouting. For instance, by using a rotating set of Bloom filters, a node can phase out neighboring nodal devices that have not been recently detected. By dynamically adjusting the size of the Bloom filter, a node is enabled to manage the false positive rate relative to its number of neighboring nodes. The Bloom filters may be reported to other devices (e.g. neighboring nodes, NMS, central computing engine, etc.) to provide neighborhood information (in addition to other (compressed) link metric). Further, the Bloom filters may also be utilized to service neighborhood set queries from the local or remote nodal devices.

Additionally, the techniques described herein in accordance with the illustrated embodiments are particularly advantageous in that the required nodal overhead for maintaining and communicating neighboring nodal information is significantly reduced. For instance, the aforesaid Bloom filter utilization reduces the neighbor table size approximately less than 32% compared to maintaining a list of EUI-64 address with a 1% false positive rate or approximately less than 16% with a 10% false positive rate. Thus, what has been described is the advantageous utilization of compressed neighborhood information to significantly improve the overhead of filtering asymmetric links, reporting neighborhood information for network management, and supporting local re-route mechanisms.

It is to be appreciated that while certain steps within procedures 500 and 600 may be optional as described above, the steps shown in FIGS. 5 and 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for maintaining and communicating neighboring nodal information in a compressed format, it is to be understood that various other adaptations and modifications may be made within the spirit and scope of the embodiments herein. For example, the embodiments have been shown and described herein with relation to LLN networks, and, in particular, the RPL protocol. However, the embodiments in their broader sense are not as limited, and may, in fact, be used with other types of networks and/or protocols.

The foregoing description has been directed to specific illustrated embodiments. It will be apparent, however, that other variations and modifications may be made to the described embodiments, with the attainment of some or all of their advantages. For is instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving information at a nodal device from a plurality of neighboring nodes of the nodal device in a computer network, the information including identifiers of each of the plurality of neighboring nodes;
maintaining a list of 1-hop neighbor nodes at the nodal device by adding the identifiers for each of the plurality of neighboring nodes to a first bloom filter;
storing the bloom filter on the nodal device, the first bloom filter made up of the identifiers for each of the neighboring nodes of the computer network received during a time period;
phasing out 1-hop neighbor nodes that are no longer 1-hop neighbor nodes by, upon the time period expiring, adding any identifiers received after the time period expires to a second bloom filter while continuing to store the first bloom filter on the nodal device until a predetermined amount of time has passed;
getting a unified view of all neighboring nodes of the plurality of neighboring nodes by performing a function on the first bloom filter and the second bloom filter;
transmitting the unified view from the first and second bloom filter to a Network Management System (NMS); and
managing a false positive rate of the first or second bloom filter at the nodal device relative to a number of nodes that neighbor the nodal device by adaptively adjusting a bit-vector size of the first or second bloom filter depending on a number of neighboring nodes added to the first or second bloom filter.

2. A method as recited in claim 1, wherein:
the information received from the plurality of neighboring nodes include link quality information,
one or more nodes of the plurality of neighboring nodes having a first link quality are added to the first bloom filter, and
one or more nodes of the plurality of nodes having a second link quality are added to a different bloom filter.

3. A method as recited in claim 1, wherein the identifiers of the plurality of neighboring nodes are stored using a different bloom filter according to a predetermined sequence of N bloom filters.

4. A method as recited in claim 3 wherein the nodal device performs a bitwise OR operation on the N bloom filters to provide the unified view of all neighboring nodes of the plurality of neighboring nodes.

5. A method as recited in claim 1, further comprising determining a signal quality of a recent signal transmission to a neighboring 1-hop node by querying the identifier of the nodal device as stored in at least the first and second bloom filters.

6. A method as recited in claim 5, wherein the unified view of the first and second bloom filter is advertised to one or more of the plurality of neighboring nodes at least one hop away.

7. A method as recited in claim l, wherein in predetermined time intervals, the nodal device transmits information stored in the first and second bloom filter to the NMS.

8. A method, comprising:
receiving at a Network Management System (NMS) for a network having nodal devices coupled via communication links, a unified view of all neighboring nodes of a plurality of neighboring nodes of at least one nodal device in the network which the NMS manages, the unified view obtained from a first and at least second bloom filter maintained in the at least one nodal device, wherein a false positive rate of the first or the at least second bloom filter at the nodal device is managed relative to a number of nodes that neighbor the at least one nodal device;

using the unified view to determine what nodes are likely reachable to each individual node by interpolating at the NMS the received information from the bloom filter to determine a status of the communication links coupling the nodal devices in the network; and querying, by the NMS, a bloom filter of the at least one nodal device in the network to determine the presence of nodes which neighbor the nodal device.

9. An apparatus, comprising:

one or more network interfaces to communicate with a computer network;

a processor coupled to the network interfaces and adapted to execute one or more processes; and a memory configured to store a process executable by the processor, the process when executed operable to:

receive information at the apparatus from a plurality of neighboring nodes of the apparatus, the information including identifiers of each of the plurality of neighboring nodes;

maintain a list of 1-hop neighbor nodes at the nodal device by adding the identifiers for each of the plurality of neighboring nodes to a first bloom filter;

store the bloom filter on the apparatus, the first bloom filter made up of the identifiers for each of the neighboring nodes of the computer network received during a time period;

phasing out 1-hop neighbor nodes that are no longer 1-hop neighbor nodes by, upon the time period expiring, adding any identifiers received after the time period expires to a second bloom filter while continuing to store the first bloom filter on the nodal device until a predetermined amount of time has passed;

getting a unified view of all neighboring nodes of the plurality of neighboring nodes by performing a function on the first bloom filter and the second bloom filter;

transmitting the unified view from the first and second bloom filter to a Network Management System (NMS); and managing a false positive rate of the first or second bloom filter at the nodal device relative to a number of nodes that neighbor the nodal device by adaptively adjusting a bit-vector size of the first or second bloom filter depending on a number of neighboring nodes added to the first or second bloom filter.

10. An apparatus as recited in claim 9 wherein the identifiers of the plurality of neighboring nodes are stored using a different bloom filter according to a predetermined sequence of N bloom filters.

11. An apparatus as recited in claim 9, wherein the process when executed is further operable to determine a signal quality of a recent signal transmission from apparatus to a neighboring 1-hop node by querying the identifier of the nodal device as stored in at least the first and second bloom filter.

12. An apparatus as recited in claim 11 wherein a unified view of the first and second bloom filters is advertised to one or more of the plurality of neighboring nodes at least one hop away.

13. An apparatus as recited in claim 9, wherein the process when executed is further operable to transmit information stored in the first and second bloom filter to the NMS in predetermined time intervals.

14. An apparatus, comprising:

one or more network interfaces to communicate with a computer network;

a processor coupled to the network interfaces and adapted to execute one or more processes; and a memory configured to store a process executable by the processor, the process when executed operable to:

receive, at a Network Management System (NMS) for a network having nodal devices coupled via communication links, a unified view of all neighboring nodes of a plurality of neighboring nodes of at least one nodal device in the computer network which the NMS manages, the unified view obtained from a first and at least second bloom filter maintained in the at least one nodal device, wherein a false positive rate of the first or the at least second bloom filter at the nodal device is managed relative to a number of nodes that neighbor the at least one nodal device;

using the unified view to determine what nodes are likely reachable to each individual node by interpolating at the NMS the received information from the bloom filter to determine a status of the communication links coupling the nodal devices in the network; and query a bloom filter of the at least one nodal device in the network to determine the presence of nodes which neighbor the nodal device.

* * * * *